United States Patent
Hornung et al.

(10) Patent No.: US 12,277,065 B2
(45) Date of Patent: Apr. 15, 2025

(54) SHARED VIRTUAL ADDRESS SPACES

(71) Applicant: Micron Technology, Inc., Boise, ID (US)

(72) Inventors: Bryan Hornung, Plano, TX (US); Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 259 days.

(21) Appl. No.: 17/647,580

(22) Filed: Jan. 10, 2022

(65) Prior Publication Data

US 2022/0292027 A1    Sep. 15, 2022

Related U.S. Application Data

(60) Provisional application No. 63/160,609, filed on Mar. 12, 2021.

(51) Int. Cl.
  *G06F 12/10*        (2016.01)
(52) U.S. Cl.
  CPC ...... *G06F 12/10* (2013.01); *G06F 2212/1056* (2013.01)
(58) Field of Classification Search
  CPC .. G06F 12/10; G06F 12/1036; G06F 12/1072; G06F 12/109; G06F 12/14
  See application file for complete search history.

(56) References Cited

U.S. PATENT DOCUMENTS

| | | | |
|---|---|---|---|
| 7,836,129 B2 | 11/2010 | Freimuth et al. | |
| 9,727,451 B2 * | 8/2017 | Zhou | G06F 12/0238 |
| 10,592,431 B2 | 3/2020 | El Hajj et al. | |
| 2008/0177974 A1 * | 7/2008 | Chiang | G06F 12/1018 |
| | | | 711/E12.002 |
| 2011/0072234 A1 * | 3/2011 | Chinya | G06F 12/1036 |
| | | | 711/E12.001 |
| 2011/0173411 A1 * | 7/2011 | Chen | G06F 12/1027 |
| | | | 711/E12.001 |
| 2012/0272027 A1 | 10/2012 | Zbiciak | |
| 2015/0012712 A1 * | 1/2015 | Penner | G06F 12/0862 |
| | | | 711/137 |
| 2015/0089180 A1 * | 3/2015 | Yamamura | G06F 12/10 |
| | | | 711/170 |

(Continued)

OTHER PUBLICATIONS

"International Search Report and Written Opinion of the International Searching Authority," issued in connection with Int'l Appl. No. PCT/US22/70142, dated May 2, 2022 (12 pages).

*Primary Examiner* — Paul M Knight
(74) *Attorney, Agent, or Firm* — Holland & Hart LLP

(57) ABSTRACT

Methods, systems, and devices for shared virtual address spaces are described. In some examples, a globally shared address space may be shared across a plurality of memory devices that are included in one or more domains. A host system may set parameters for determining whether an address (e.g., a virtual address) is included within the globally shared address space, and whether the address is associated with a memory device. When a memory device receives a memory request (e.g., a data packet), a processing unit of the memory device may determine whether an address included in the memory request is associated with the memory device. The processing unit may either initiate an access operation on a physical address of the memory device or transmit the memory request to another memory device.

23 Claims, 7 Drawing Sheets

| Register | Bits | Field |
|---|---|---|
| 405 Region_Base | 29:0 | RsvdP |
| | 56:30 | Address |
| | 63:57 | RsvdP |
| 410 Region_Top | 29:0 | RsvdP |
| | 56:30 | Top |
| | 63:57 | RsvdP |
| 415-a Local_VID[0] | 5:0 | Shift |
| | 7:6 | RsvdP |
| | 17:8 | Mask |
| | 27:18 | Local_VID |
| | 31:28 | RsvdP |
| | 37:32 | GU_Range_ID |
| | 39:38 | RsvdP |
| | 59:40 | PASID |
| | 62:60 | RsvdP |
| | 63 | Valid |
| 415-n Local_VID[n] | 5:0 | Shift |
| | 7:6 | RsvdP |
| | 17:8 | Mask |
| | 27:18 | Local_VID |
| | 31:28 | RsvdP |
| | 37:32 | GU_Range_ID |
| | 39:38 | RsvdP |
| | 59:40 | PASID |
| | 62:60 | RsvdP |
| | 63 | Valid |
| 420 Region_Attributes | 62:0 | RsvdP |
| | 63 | Valid |

400

(56) References Cited

U.S. PATENT DOCUMENTS

| | | | |
|---|---|---|---|
| 2018/0137045 A1* | 5/2018 | Siebert | G06F 12/1036 |
| 2019/0265976 A1* | 8/2019 | Goryavskiy | G06F 9/30058 |
| 2020/0026461 A1* | 1/2020 | Tune | G06F 12/0802 |
| 2021/0051118 A1* | 2/2021 | Wang | H04L 49/9015 |
| 2021/0073042 A1* | 3/2021 | Duluk, Jr. | G06F 1/04 |

* cited by examiner

| Register | Bits | Field |
|---|---|---|
| Region_Base | 29:0 | RsvdP |
| | 56:30 | Address |
| | 63:57 | RsvdP |
| Region_Top | 29:0 | RsvdP |
| | 56:30 | Top |
| | 63:57 | RsvdP |
| Local_VID[0] | 5:0 | Shift |
| | 7:6 | RsvdP |
| | 17:8 | Mask |
| | 27:18 | Local_VID |
| | 31:28 | RsvdP |
| | 37:32 | GU_Range_ID |
| | 39:38 | RsvdP |
| | 59:40 | PASID |
| | 62:60 | RsvdP |
| | 63 | Valid |
| Local_VID[n] | 5:0 | Shift |
| | 7:6 | RsvdP |
| | 17:8 | Mask |
| | 27:18 | Local_VID |
| | 31:28 | RsvdP |
| | 37:32 | GU_Range_ID |
| | 39:38 | RsvdP |
| | 59:40 | PASID |
| | 62:60 | RsvdP |
| | 63 | Valid |
| Region_Attributes | 62:0 | RsvdP |
| | 63 | Valid |

FIG. 4

SHARED VIRTUAL ADDRESS SPACES

CROSS REFERENCE

The present application for patent claims priority to U.S. Provisional Patent Application No. 63/160,609 by HORNUNG et al., entitled "SHARED VIRTUAL ADDRESS SPACES," filed Mar. 12, 2021, which is assigned to the assignee hereof and is expressly incorporated by reference in its entirety herein.

FIELD OF TECHNOLOGY

The following relates generally to one or more systems for memory and more specifically to shared virtual address spaces.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAIVI), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

BRIEF DESCRIPTION OF THE DRAWINGS

FIG. 4 illustrates an example of a block diagram illustrating a table that supports shared virtual address spaces in accordance with examples as disclosed herein.

DETAILED DESCRIPTION

Some interfaces (e.g., the Compute Express Link (CXL) interface) are designed to be used between a host system and one or more memory systems. For example, the memory systems may use memory coherently across the host system and memory system. Thus, the CXL interface is directed to a single-host domain and host managed control of coherency of a single memory system. Due to a host managing coherency for a single domain, the amount (e.g., the quantity) of memory accessible may be limited by the memory devices included in the domain. For example, the host may have access to 16 GB worth of memory that is included in the single-host domain. In some instances, however, it may be desirable to utilize a global address space across multiple memory systems (e.g., across multiple domains) in order to provide larger accessible address spaces for memory access requests.

A system that allows for a variable width virtual device identifier for globally shared address spaces is described herein. For example, a host system (e.g., an operating system) may set parameters for determining whether an address (e.g., a virtual address) is associated with a memory device. The parameters may include a shift parameter indicating how to shift the virtual address, a mask parameter to mask bits of the shifted virtual address, and a device identifier of the memory device for the globally shared address space. The memory device may be configured with a vector of parameters for assigning different ranges and device identifiers for different globally shared address spaces. The memory device may be configured with a globally shared region including a region base and region top for determining if a virtual address is within a globally shared address space. Utilizing the global address space across multiple memory systems may provide flexibility to the overall system, as well as larger accessible address spaces for memory access requests. Moreover, utilizing device identifiers may allow for address translations to be performed on a per-device basis, thus reducing the quantity of address translations any one CXL device may need to perform.

Figure 1:
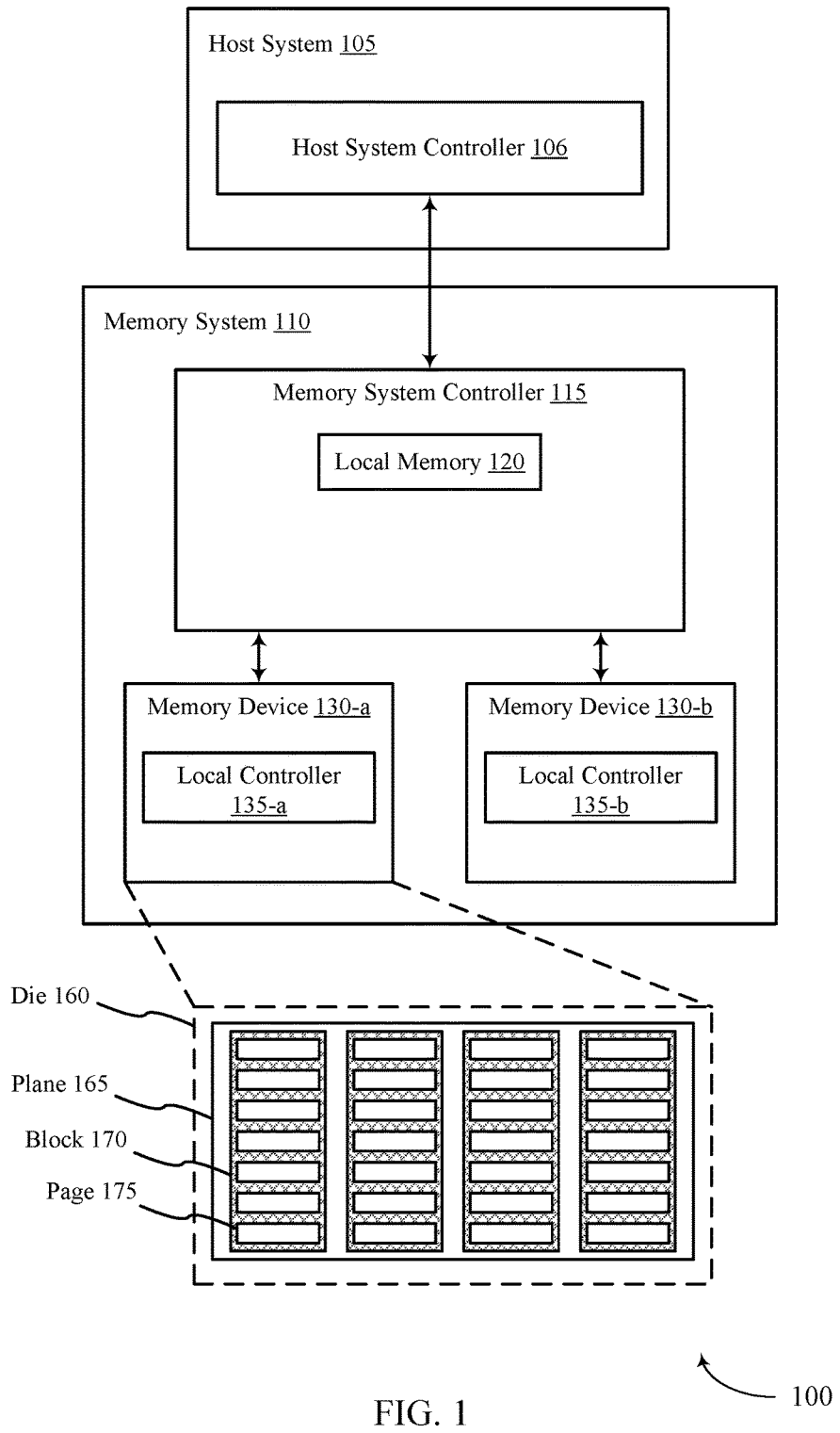
FIG. 1 illustrates an example of a system that supports shared virtual address spaces in accordance with examples as disclosed herein.
Figure 2:
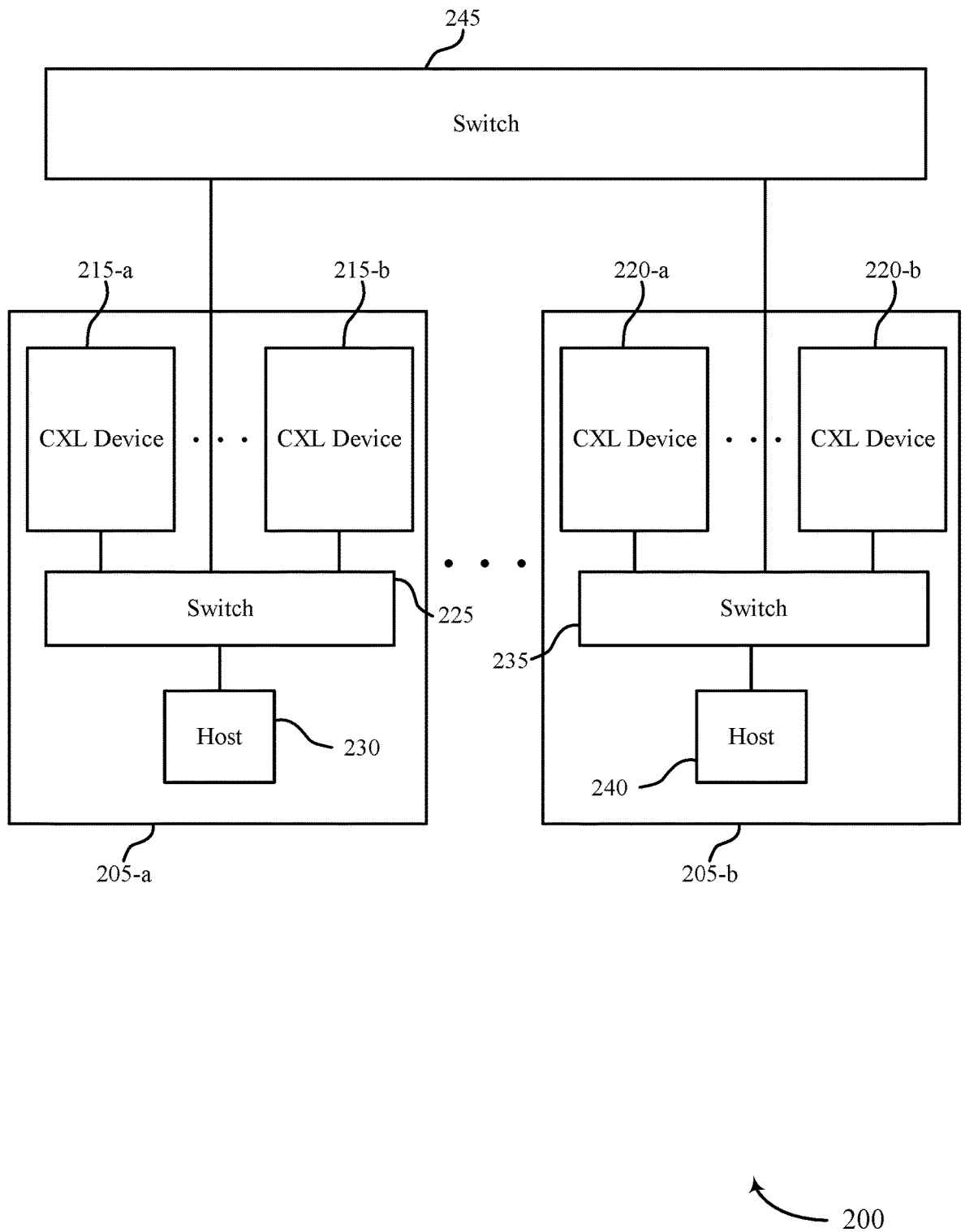
FIG. 2 illustrates an example of a system that supports shared virtual address spaces in accordance with examples as disclosed herein.

Features of the disclosure are initially described in the context of systems with reference to FIGS. 1 through 2. Features of the disclosure are described in the context of block diagrams with reference to FIGS. 3 and 4. These and other features of the disclosure are further illustrated by and described in the context of an apparatus diagram and flowchart that relate to virtual addresses for a memory system with reference to FIGS. 5-7.

FIG. 1 illustrates an example of a system 100 that supports virtual addresses for a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB)

flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), a Low Power Double Data Rate (LPDDR) interface, and a CXL interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device, though other types of managed memory devices are supported. For example, a managed memory device may include any type or quantity of volatile or non-volatile memory devices.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support virtual addresses for a memory system. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, the memory system 110 may include memory devices that are configured to communicate with each other directly. For example, a virtual address space may exist across a portion (or all) of one or more memory systems, including the memory system 110, and may be associated with the memory devices that are configured to communicate with each other directly. Moreover, the memory system controller 115, which may be an example of a memory management unit (MMU) may be configured to determine whether a virtual address is included within a shared virtual address space and whether the virtual address is associated with the particular memory system 110. Additionally or alternatively, the memory system 110 may include a processor (not shown) that may perform operations on the memory devices, thus generating memory requests (that include a virtual address) that the MMU may handle.

When a MMU receives a memory request, it may determine whether an address (e.g., a virtual address) included in the request is included within a shared virtual address space. As described herein, the MMU may include or have access to a table that includes parameters for interpreting the address bits included in the memory request. The parameters included in the table may be established (e.g., set) by the host system 105. The MMU may determine whether the address included in the request is included within the shared virtual address space by comparing a first value associated with a subset of address bits to a second value and a third value included in the table. Based on the comparison, the MMU may determine that the virtual address is included in the shared virtual address space.

Additionally or alternatively, the MMU may determine whether the address included in the request is associated with a corresponding memory device (e.g., a memory device that the MMU is associated with). The MMU may interpret different address bits, according to the table, to determine an identifier (e.g., a device identifier) associated with the address. If the identifiers match, then the MMU may access a physical address associated with the virtual address included in the memory request. However, if the identifiers do not match, then the MMU may transmit the memory request to another memory device. Utilizing the shared virtual address space across multiple memory systems (such as the memory system 110) may provide flexibility to the overall system, as well as larger accessible address spaces for memory access requests. Moreover, utilizing device identifiers may allow for address translations to be performed on a per-device basis, thus reducing the quantity of address translations any one CXL device may need to perform.

FIG. 2 illustrates an example of a system 200 that supports virtual addresses for a memory system in accordance with examples as disclosed herein. The system 200 may be an example of a system 100 as described with reference to FIG. 1 or aspects thereof. The system 200 may include a first memory domain 205-a and a second memory domain 205-b. Each memory domain may include one or more memory devices (such as CXL device 215-a), one or more switches (such as switch 225), and a respective host system (such as host system 230). In some examples, the system 200 may implement aspects of the system 100 as described with reference to FIG. 1. For example, memory device 215-a may be an example of the memory system 110 and the host system 230 may be an example of the host system 105 as described with reference to FIG. 1.

In some examples, the system 200 may include a first memory domain 205-a, which may also be referred to as a first OS domain 205-a. The first memory domain 205-a may include or may be associated with one or more memory devices 215, which may be CXL memory devices 215. For example, one or more of the memory devices 215 may include device memory, a controller, and a processing unit (not shown) and may be configured to interface with the host system 230 and other CXL memory devices 215 via the switch 225. Additionally or alternatively, the system 200 may include a domain 205-b, which may be referred to as a second domain 205-b, a second OS domain 205-b, or a second memory domain 205-b. The second memory domain 205-b may include or may be associated with one or more memory devices 220, which may be CXL memory devices 220. For example, each memory device 220 may include device memory, a controller, and a processing unit (not shown) and may be configured to interface with the host system 240 via the switch 235.

Although the first memory domain 205-a and the second memory domain 205-b are illustrated as including two memory devices (e.g., memory devices 215 and memory devices 220), the first memory domain 205-a and the second memory domain 205-b may include any quantity of memory devices. Moreover, the system 200 may include any quantity of domains. The memory devices within each domain may communicate with a respective host device via a switch (or, in some instances, via more than one switch). Additionally or alternatively, the switch (or switches) of each domain may communicate with each other directly or via a switch (e.g., via a top-of-rack switch). For example, the switch 225 may communicate with the switch 235 directly (not shown) or via the top-of-rack switch 245.

In some instances the switches may include logic or other processing capabilities in order to communicate with each other. For example, the switch 225 may include logic to determine whether to route a data packet to the switch 245 or to a memory device included in the domain 205-a. Moreover, the switch 245 may include logic or other processing capabilities to determine which domain to route a data packet to. Additionally or alternatively, the switch 225 may include logic to determine whether to route a data packet to the switch 245 or to a memory device included in the domain 205-b. Accordingly, the memory devices 215 may communicate with the memory devices 220 via the switch 225, the switch 235, and the top-of-rack switch 245. Additionally or alternatively, memory devices 220 and/or host system 230 of a domain 205 may communicate with each other directly (e.g., not via switch 225).

In some instances, the processing units and controllers of the respective memory devices 215 may be a single logic component formed on a same field programmable gate array (FPGA) or application-specific integrated circuit (ASIC). However, in some examples, the controller and processing unit may be individual components. For example, the processing unit may be a graphics processing unit (GPU) or general-purpose graphics processing unit (GPGPU). The processing unit may be configured to transmit signaling and/or commands to the controller for accessing the device memory. As described herein, the processing unit may be configured to generate a data packet that can be transmitted directly to another memory device within the system 200 without interaction by a respective host system.

In some instances, the device memory of each memory device (e.g., of each memory device 215 or of each memory device 220) may be configured to store data transferred between the respective memory device and host system, e.g., in response to receiving access commands from the respective host system, as described herein. The memory devices may include one or more memory devices as described with reference to FIG. 1. For example, the memory devices may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

Moreover, the controller or processing unit of each memory device (e.g., of each memory device 215 or of each memory device 220) may control the passing of data directly to and from the respective memory device, e.g., for storing data, retrieving data, and determining memory locations in which to store data and from which to retrieve data. The controller or processing unit may communicate with the device memory of the respective memory device directly or via a bus using a protocol specific to each type of memory device. In some cases, a single controller may be implemented for each memory device, while in other examples some of the memory devices may include multiple controllers. In some cases, a respective controller may implement aspects of a memory system controller 115 as described with reference to FIG. 1.

The controller or processing unit of each memory device may additionally be configured for operations associated with the respective memory device. For example, the controller or processing unit may execute or manage operations such as wear-leveling operations, garbage collection operations, error control operations such as error-detecting operations or error-correcting operations, encryption operations, caching operations, media management operations, background refresh, health monitoring, and address translations. For example, the controller or processing unit may translate virtual addresses to physical addresses, or may translate virtual addresses to logical addresses (e.g., LBAs), which may be translated to physical addresses (e.g., physical block addresses) associated with memory cells within the memory device.

In some examples, the device memory for each memory device may be configured to store data that is accessible by the respective processing unit (e.g., via the controller of the respective memory device) and the respective host device. Because the data is accessible by both the processing unit and the host device (e.g., the data is shared), it may be desirable for coherency of the data to be tracked. That is, it may be desirable for both the processing unit and the host device to know whether data in the device memory (or a cache of the respective memory device) is coherent with corresponding data (for the same address) that was transmitted to the host device. Such coherency may be referred to as device coherency.

In other examples, an access operation may be performed (e.g., at the memory device 220-a) based on receiving a data packet from another memory device (e.g., the memory device 215-a). In such instances, the data may or may not be coherent since device coherency is tracked on a per-domain basis. This coherency may be referred to as I/O coherency, where the data is read as coherent at the time of access. That is, host systems may not track whether data associated with other domains is coherent, but the data may be still be accessed. However, upon accessing the data, the host system associated with the receiving device (e.g., the host system 240) may be notified to recall the most up-to-date version of the data.

By way of example, a shared virtual address space may exist across at least a portion of the memory device 215-a, the memory device 215-b, the memory device 220-a, and the memory device 220-b. A physical address of a respective memory device may be accessed based on one or more fields included in a data packet. For example, the controller or processing unit of the memory device 215-a may receive a memory request that includes an address (e.g., a virtual address). The controller or processing unit may determine whether the address is associated with a shared virtual address space and, if so, whether the address is associated with the memory device 215-a. If the address is both associated with the shared virtual address space and the memory device 215-a, the controller or processing unit may determine a physical address associated with the virtual address, and perform an access operation on the physical address of the device memory of the memory device 215-a.

To determine whether a received address is within a shared global address space, the controller or processing unit of the memory device 215-a may access a table containing instructions for interpreting bits included in the virtual address. In some instances, the table may be stored to memory associated with the memory device 215-a (e.g., each memory device 215 and each memory device 220 may have access to a respective table). The table may indicate which address bits of a virtual address are used to determine whether the virtual address is included in the shared virtual address space. For example, the starting address (e.g., a base address) of the shared virtual address space may be represented by a second value and the ending address (e.g., the top address) of the shared virtual address space may be represented by a third value. The controller or processing unit may compare a first value, represented by a subset of bits included in the virtual address, to the second and third values.

If the first value is greater than or equal to the second value (e.g., a value representing the base address) and less than or equal to the third value (e.g., a value representing the top address), then the virtual address is included in the shared virtual address space and the controller or processing unit may then determine whether the virtual address is associated with the memory device 215-a. In other examples, if the first value is outside of the range established by the second value and the third value, then the controller or processing unit may transmit the virtual address to another memory device.

To determine whether a received address is associated with the memory device 215-a, the controller or processing unit of the memory device 215-a may utilize the table to determine an identifier (e.g., a device identifier) associated with the address. For example, the controller or processing unit may determine a value associated with a subset of bits of the address based on one or more parameters (e.g., a shift parameter, a mask parameter, etc. as described with reference to FIG. 3). If a value represented by the subset of bits of the address matches the device identifier of the memory device 215-a, the virtual address is associated with the memory device 215-a, and a physical address corresponding to the virtual address may subsequently be accessed (e.g., by the controller or the processing unit). Utilizing a shared virtual address space across multiple memory devices (such as the memory devices 215-a, 215-b, 220-a, and 220-b) may provide flexibility to the overall system, as well as larger accessible address spaces for memory access requests.

Moreover, utilizing device identifiers may allow for address translations to be performed on a per-device basis, thus reducing the quantity of address translations any one CXL device may need to perform.

Figure 3:
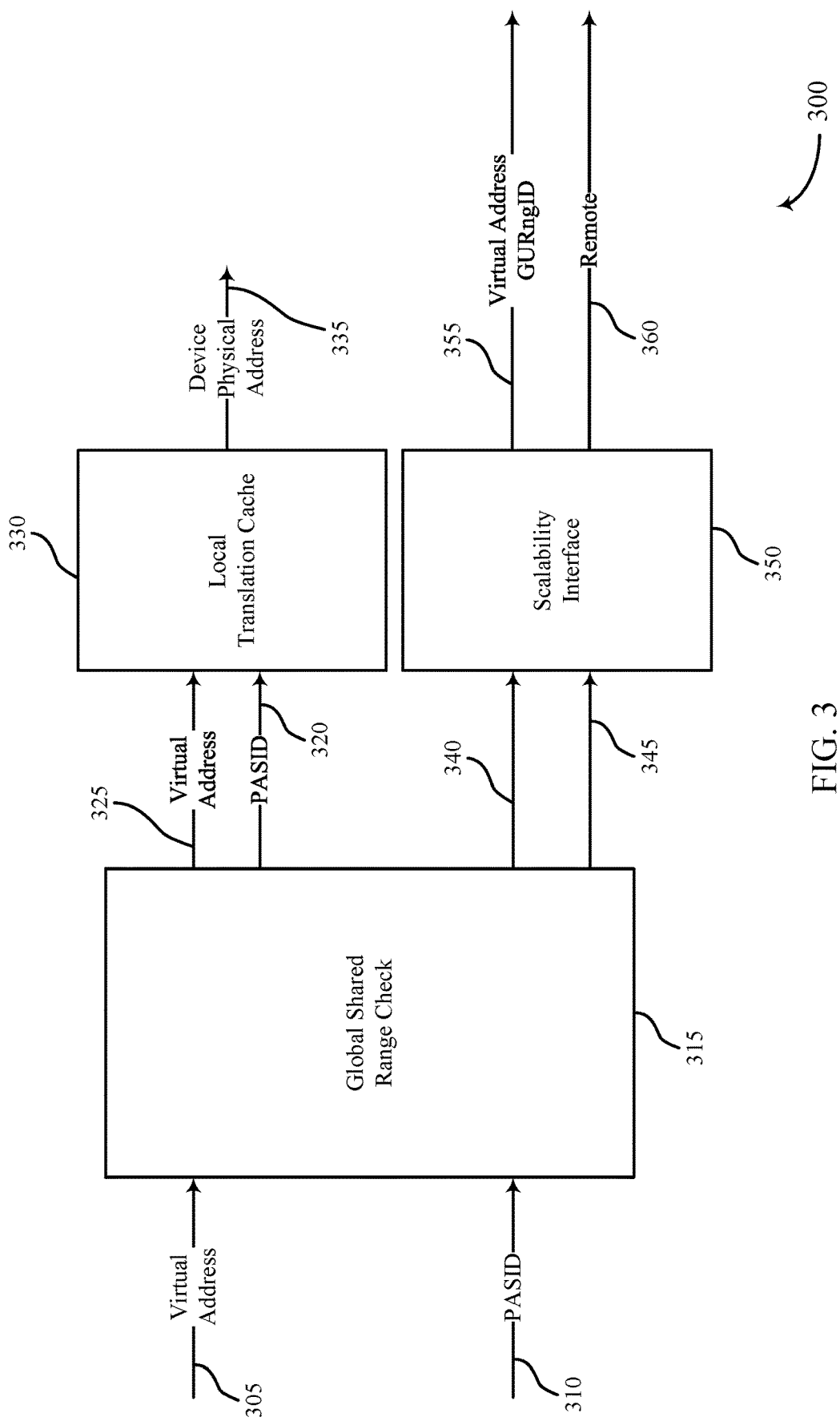
FIG. 3 illustrates an example of a block diagram illustrating aspects of a memory management unit that supports shared virtual address spaces in accordance with examples as disclosed herein.

FIG. 3 illustrates an example of a block diagram 300 of a MMU that supports shared virtual address spaces in accordance with examples as disclosed herein. The memory management unit may include one or more blocks or components for determining whether an address associated with a memory request is included within a global shared address space and whether the address is associated with a memory device that the MMU is included in. For example, the MMU may include a global shared range check block 315, a local translation cache 330, and a scalability interface 350.

In some instances, the global shared range check block 315 may determine whether an address associated with a memory request is included within a global shared address space and whether the address is associated with a memory device associated with the MMU. The local translation cache 330 may translate the address if the address is associated with the memory device the MMU is included in, and the scalability interface 350 may transmit the memory request (e.g., the address) to another memory device if the address is not associated with the memory device the MMU is included in. Utilizing the global address space across multiple memory systems may provide flexibility to the overall system, as well as larger accessible address spaces for memory access requests. Moreover, utilizing device identifiers may allow for address translations to be performed on a per-device basis, thus reducing the quantity of address translations any one CXL device may need to perform.

A global address space (or a shared virtual address space) may be defined across multiple memory devices that may be included in one or more domains. For example, a shared virtual address space may be defined across at least a portion of the memory device 215-a, the memory device 215-b, the memory device 220-a, and the memory device 220-b as described with reference to FIG. 2. Each memory device included in the shared virtual address space may include a range (e.g., a range of the entire shared address space) that is defined by a power of two (e.g., $2^X$) boundary, where a quantity of address bits associated with the range of the given device may be less than or equal to X. Moreover, each memory device included in the shared virtual address space may be associated with a device identifier, which may be defined as the log base 2 of N bits above the address bits for the given memory device. When a memory request is received by a MMU of a memory device, the MMU may determine whether an address (e.g., a virtual address) included in the request is within the shared virtual address space and whether the address is associated with the associated memory device.

In some examples, the global shared range check block 315 of the MMU may receive a memory request. For example, a memory device (e.g., CXL device 215) may include a processor that may generate the memory request. In some examples, the memory request may include a virtual address 305 and a process identifier 310 (e.g., a PASID 310). In some instances, the PASID 310 may identify a process associated with the virtual address 305. For example, the PASID 310 may indicate that the virtual address 305 is associated with graphics processing. Because some virtual addresses may be associated with more than one process, the PASID 310 may be used to determine a physical address associated with the virtual address 305. That is, different processes may be associated with a same virtual address, but may map to different physical addresses of the associated memory device.

To determine whether the virtual address 305 is included within a shared virtual address space and whether the virtual address 305 is associated with the particular memory device (e.g., the memory device associated with the MMU that includes the global shared range check block 315), the global shared range check block 315 may store or have access to the table illustrated by the block diagram 400 as described with reference to FIG. 4. A version of the table illustrated by the block diagram 400 may be stored to each MMU included in a memory system, and may inform the MMU how to interpret a received address, such as the virtual address 305. For example, the table may inform the MMU which bits of the virtual address 305 to use in order to determine whether the virtual address 305 is included within a shared virtual address space and whether the virtual address 305 is associated with the particular memory device.

Thus, FIG. 4 illustrates an example of a block diagram 400 of a table that supports shared virtual address spaces in accordance with examples as disclosed herein. The table may include parameters for determining whether a virtual address is included within a shared virtual address space and whether the virtual address is associated with the particular memory device. The parameters may be set by a host device, and may vary for each MMU. That is, each MMU may include a different version of the table that is specific to the respective MMU. In some instances, the parameters may be set by a host device when a shared virtual address space is established. That is, a host device (e.g., the host device associated with the domain comprising the memory device) may set the parameters for the MMU to establish ranges of virtual addresses associated with the memory device for one or more shared virtual address spaces (e.g., associated with different processes). The MMU (e.g., memory device) may receive the parameters in one or more configuration messages. The parameters may be used by the MMU (e.g., the parameters may remain valid) so long as a value represented by at least one bit included in the virtual address 305 matches a value of a valid bit. For example, the parameters may be used by the MMU so long as a value represented by bit sixty-three (63) (e.g., as shown in the Region Attributes register 420) indicates that the entries in the table (e.g., for a given region) are valid. Although FIG. 4 illustrates one example of parameters (e.g., bit fields) for supporting shared virtual address spaces, it should be understood that alternative arrangements of the parameters are possible, including the parameters being in a different order in the table, or the parameters having different lengths (e.g., numbers of bits).

In some instances, the Region_Base register 405 and the Region_Top register 410 may indicate which address bits of a virtual address are used to determine whether the virtual address is included in the shared virtual address space. For example, the starting address (e.g., a base address) of the shared virtual address space may be represented by a second value and the ending address (e.g., the top address) of the shared virtual address space may be represented by a third value. In the example illustrated in FIG. 4, the Region_Base register 405 and Region_Top register 410 both indicate that bits 56:30 of a received virtual address may be used for determining whether the virtual address is included in the shared virtual address space.

Thus, the global shared range check block 315 may determine a first value represented by bits 56:30 of the virtual address 305. If the first value is greater than or equal to the second value (e.g., a value representing the base address) and less than or equal to the third value (e.g., a value representing the top address), then the virtual address 305 is included in the shared virtual address space. In such instances, the global shared range check block 315 may determine whether the virtual address 305 is associated with the corresponding memory device. In other examples, if the first value is outside of the range established by the second value and the third value, then the global shared range check block 315 may transmit the virtual address to the local translation cache 330.

If the virtual address 305 is included in the shared virtual address space, then the global shared range check block 315 may determine whether the virtual address 305 is associated with the memory device for the shared virtual address space. To determine whether the virtual address 305 is associated with the corresponding memory device, the global shared range check block 315 may determine a value represented by bits 5:0 of the table. As shown in FIG. 4, the Local_VID[0] register 415-*a* may indicate that bits 5:0 of the table are shift bits. The shift bits may indicate the number (e.g., the quantity) of bits to shift the address to move the device identifier (e.g., the Device VID) to bit 0. That is, the virtual address may be shifted (e.g., right, dividing) by a value indicated by the shift bits [5:0]. For example, if the value of the shift bits is thirty (30), the virtual address may be shifted to the right by 30 bits, placing original bit 30 in the location of bit 0 of the shifted address. In other words, a value represented by the shift bits may indicate a starting bit to use for determining the device identifier.

Moreover, after determining the starting bit for determining the device identifier (e.g., based on a value represented by the shift bits 5:0), the global shared range check block 315 may determine a value represented by bits 17:8 of the Local_VID[0] register 415-*a*. As shown in FIG. 4, bits 17:8 of the Local_VID[0] register 415-*a* may be mask bits. The mask bits may indicate which address bits to use for determining the device identifier (e.g., the shifted address bits may be ANDed with the mask bits). Thus, the value of the shift bits may indicate a starting bit and the value of the mask bits may indicate a quantity of bits to use to determine the device identifier.

Additionally or alternatively, the global shared range check block 315 may determine a value represented by bits 27:18 of the virtual address 305. As shown in FIG. 4, bits 27:18 of a received virtual address may be Local_VID bits. The Local_VID bits may indicate a value (e.g., device identifier) to compare with the value determined based on the shifted and masked bits from the virtual address 305. Accordingly, the global shared range check block 315 may compare a value represented by the Local_VID bits to the device identifier from the virtual address (e.g., based on shifting and masking the virtual address). If the value associated with the Local_VID bits matches the device identifier from the virtual address, the virtual address 305 is associated with the memory device, and a physical address corresponding to the virtual address 305 may subsequently be accessed (e.g., via local translation cache 330). In some instances, the value associated with the Local_VID bits may not match the device identifier, and the virtual address 305 may be transmitted to the scalability interface 350.

In some examples, a memory device may be associated with one or more logical devices. For example, the memory devices described with reference to FIG. 2 (e.g., the memory device 215-*a*) may include one or more logical devices. That is, each memory device may include one or more logical devices that may be used for different processes. Thus the memory device 215-*a* may include a first logical device that is associated with a first process or first type of processes (e.g., graphics processing), and a second logical device that is associated with a second process or a second type of processes (e.g., network interfacing). To account for logical devices, the table illustrated by the block diagram 400 may include more than one Local_VID register.

As shown in FIG. 4, the table may include Local_VID[n] register 415-*n*, where n may represent a positive integer. For example, a single memory device may include nine (9) logical devices, thus the table may include entries for Local_VID[0] through Local_VID[8]. Each Local_VID register may include entries for interpreting bits of a virtual address (e.g., the virtual address 305) to determine whether the logical address is associated with a particular virtual device. Accordingly, in some examples the Local_VID register may be a vector of Local_VID registers.

As described herein, if the global shared range check block 315 determines that the virtual address 305 is associated with a corresponding memory device, the virtual address 325 and the PASID 320 may be transmitted to a local translation cache 330. The local translation cache 330 may determine a device physical address 335 associated with the memory device based on the virtual address 325 and/or the PASID 320. For example, the PASID 320 may identify a process associated with the virtual address 305, and the local translation cache 330 may determine a device physical address 335 based on both the virtual address 325 and the PASID 320. That is, the local translation cache 330 may determine a device physical address 335 that is associated with a process associated with the virtual address 325. In other examples, the virtual address 325 may not be associated with a PASID 320 (e.g., the PASID bits may not identify an associated process), and the local translation cache 330 may determine the device physical address 335 based on only the virtual address 325. The memory device (e.g., a physical address of the memory device) may be accessed based on the local translation cache 330 determining the device physical address.

In other examples, if the global shared range check block 315 determines that the virtual address 305 is not associated with a corresponding memory device for the MMU, the virtual address 340 may be transmitted to the scalability interface 350. In some examples, a signal 345 indicating that the virtual address is associated with a remote device may also be transmitted to the scalability interface 350. A remote device may refer to any memory device, located within a same or different domain, that is different than the memory device associated with the MMU represented by the block diagram 300.

Upon receiving the virtual address 340 and the signal 345, the scalability interface 350 may generate a globally unique range ID that may be used to access the proper egress structure of the associated memory device, and to access the proper ingress structure of the receiving memory device (e.g., the remote device). As shown in FIG. 4, the GU Range ID (e.g., the GURngID) may be associated with bits 37:32 of the Local_VID[0] register 415-*a*. Upon generating the GURngID, the scalability interface 350 may transmit the GURngID and virtual address to a remote device (e.g., via signal path 355). Moreover, the scalability interface 350 may transmit the remote signal 360 to the remote memory device, which may receive and process the virtual address as described herein with reference to FIG. 3. Utilizing the global address space across multiple memory systems may provide flexibility to the overall system, as well as larger accessible address spaces for memory access requests. Moreover, utilizing device identifiers may allow for address translations to be performed on a per-device basis, thus reducing the quantity of address translations any one CXL device may need to perform.

Figure 5:
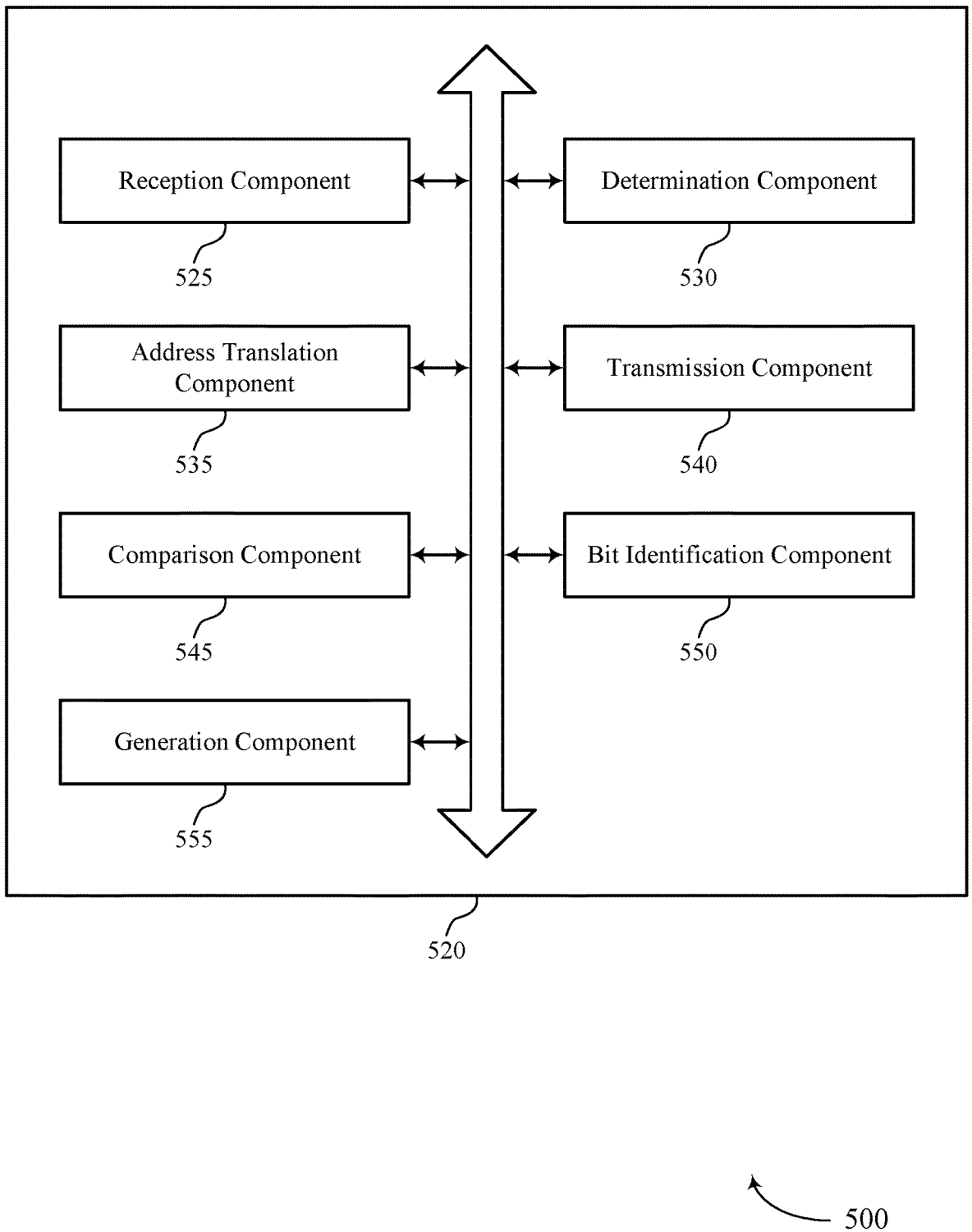
FIG. 5 shows a block diagram of a memory device that supports shared virtual address spaces in accordance with examples as disclosed herein.

FIG. 5 shows a block diagram 500 of a memory device 520 that supports shared virtual address spaces in accordance with examples as disclosed herein. The memory device 520 may be an example of aspects of a memory device as described with reference to FIGS. 1 through 4. The memory device 520, or various components thereof, may be an example of means for performing various aspects of shared virtual address spaces as described herein. For example, the memory device 520 may include a reception component 525, a determination component 530, an address translation component 535, a transmission component 540, a comparison component 545, a bit identification component 550, a generation component 555, or any combination thereof. Each of these components may communicate, directly or indirectly, with one another (e.g., via one or more buses).

The reception component 525 may be configured as or otherwise support a means for receiving, at a first memory device, a memory request associated with a virtual address of a virtual address space. In some examples, the reception component 525 may be configured as or otherwise support a means for receiving, from a host system coupled with the first memory device, the parameter associated with the range of the virtual address corresponding to the device identifier, where determining that the virtual address is associated with the first memory device is based at least in part on receiving the parameter.

In some examples, the reception component 525 may be configured as or otherwise support a means for receiving, from a host system coupled with the first memory device, signaling including the device identifier associated with the first memory device for the shared address space and the parameter associated with the range of the virtual address corresponding to the device identifier, where the device identifier and the parameter are stored to a table for determining whether virtual addresses are associated with the first memory device. In some examples, the reception component 525 may be configured as or otherwise support a means for receiving, at a first memory device, a memory request associated with a virtual address of a virtual address space.

The determination component 530 may be configured as or otherwise support a means for determining that the virtual address is within a shared address space of the virtual address space based at least in part on the virtual address. In some examples, the determination component 530 may be configured as or otherwise support a means for determining that the virtual address is associated with the first memory device based at least in part on the virtual address, a device identifier associated with the first memory device for the shared address space, and a parameter associated with a range of the virtual address corresponding to a device identifier of the memory request.

In some examples, the determination component 530 may be configured as or otherwise support a means for determining that the first value is greater than or equal to the second value. In some examples, the determination component 530 may be configured as or otherwise support a means for determining that the first value is less than or equal to the third value, where the virtual address is within the shared address space of the virtual address space based at least in part on the first value being greater than or equal to the second value and the first value being less than or equal to the third value.

In some examples, the determination component 530 may be configured as or otherwise support a means for determining that the virtual address is within a shared address space of the virtual address space based at least in part on the virtual address. In some examples, the determination component 530 may be configured as or otherwise support a means for determining that the virtual address is not associated with the first memory device based at least in part on the virtual address, a device identifier associated with the first memory device for the shared address space, and a parameter associated with a range of the virtual address corresponding to a device identifier of the memory request.

The address translation component 535 may be configured as or otherwise support a means for translating the virtual address to a physical address associated with the first memory device based at least in part on determining that the virtual address is within the shared address space and associated with the first memory device.

In some examples, the transmission component 540 may be configured as or otherwise support a means for transmitting the virtual address to a second memory device based at least in part on determining that the virtual address is not associated with the first memory device. The transmission component 540 may be configured as or otherwise support a means for transmitting the virtual address to a second memory device according to a device identifier associated with the second memory device based at least in part on determining that that the virtual address is within the shared address space and the virtual address is associated with the second memory device. In some examples, the transmission component 540 may be configured as or otherwise support a means for transmitting the identifier with the virtual address to the second memory device based at least in part on generating the identifier.

In some examples, to support determining that the virtual address is within the shared address space of the virtual address space, the comparison component 545 may be configured as or otherwise support a means for comparing a first value represented by a first subset of bits that are included in the virtual address to a second value. In some examples, to support determining that the virtual address is within the shared address space of the virtual address space, the comparison component 545 may be configured as or otherwise support a means for comparing the first value represented by the first subset of bits that are included in the virtual address to a third value based at least in part on comparing the first value to the second value.

In some examples, to support determining that the virtual address is associated with the first memory device, the comparison component 545 may be configured as or otherwise support a means for comparing a second value represented by the second subset of bits to the device identifier based at least in part on identifying the second subset of bits, where translating the virtual address to the physical address is based at least in part on the second value matching the device identifier associated with the first memory device. In some examples, to support determining that the virtual address is associated with the first memory device, the comparison component 545 may be configured as or otherwise support a means for comparing values represented by the respective subsets of bits to respective device identifiers of the plurality of device identifiers based at least in part on identifying the respective subsets of bits, where translating the virtual address to the physical address is based at least in part on the one of the values matching the respective device identifier.

In some examples, to support determining that the virtual address is not associated with the first memory device, the comparison component 545 may be configured as or otherwise support a means for comparing a value represented by the subset of bits to the device identifier based at least in part on identifying the subset of bits, where transmitting the virtual address to the second memory device is based at least in part on the value being different than the device identifier associated with the first memory device.

In some examples, to support determining that the virtual address is associated with the first memory device, the bit identification component 550 may be configured as or otherwise support a means for identifying a second subset of bits that are included in the virtual address based at least in part on the parameter associated with the range of the virtual address. In some examples, to support determining that the virtual address is associated with the first memory device, the bit identification component 550 may be configured as or otherwise support a means for identifying, for each of the plurality of parameters, respective subsets of bits of the virtual address based at least in part on a respective parameter of the plurality of parameters.

In some examples, to support determining that the virtual address is not associated with the first memory device, the bit identification component 550 may be configured as or otherwise support a means for identifying a subset of bits that are included in the virtual address based at least in part on the parameter associated with the range of the virtual address corresponding to the device identifier of the memory request.

In some examples, the generation component 555 may be configured as or otherwise support a means for generating an identifier associated with the shared address space of the virtual address space based at least in part on determining that the virtual address is not associated with the first memory device. In some examples, the generation component 555 may be configured as or otherwise support a means for generating, based at least in part on determining that the virtual address is not associated with the first memory device, a second identifier for transmitting to the second memory device, wherein the second identifier is associated with a global virtual address, wherein transmitting the virtual address comprises transmitting the second identifier.

In some examples, the virtual address includes a third subset of bits that indicate a position of a first bit included in the second subset of bits. In some examples, identifying the second subset of bits is based at least in part on a third value represented by the third subset of bits. In some examples, translating the virtual address to the physical address is based at least in part on one or more processes associated with the shared address space of the virtual address space.

In some examples, the first memory device is located within a first memory system and the second memory device is located within a second memory system that is different than the first memory system. In some examples, the first memory device and the second memory device are each located within a same memory system. In some examples, the first memory device and the second memory device are associated with respective ranges of the shared address space of the virtual address space.

Figure 6:
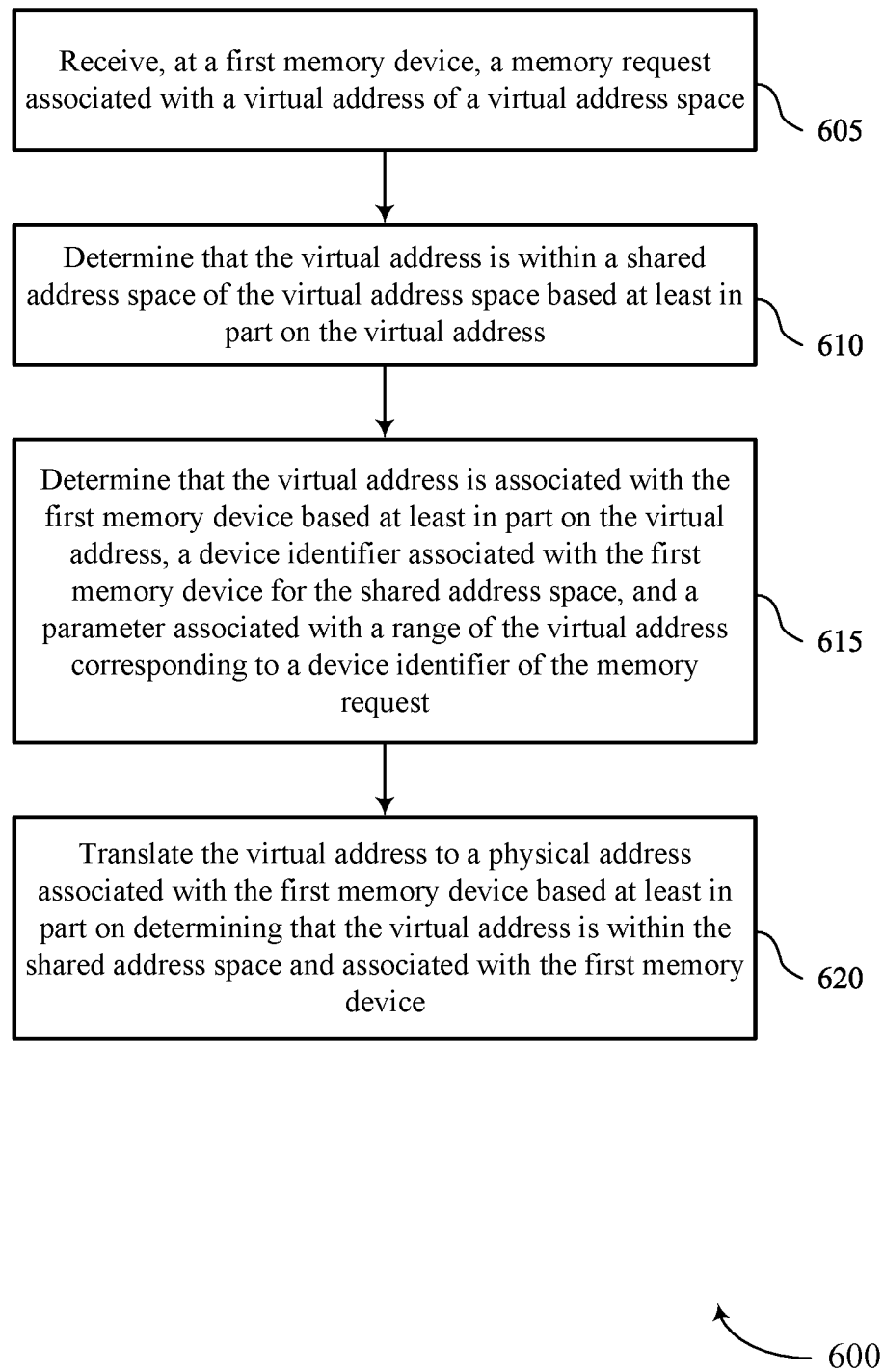
FIGS. 6 and 7 show flowcharts illustrating a method or methods that support shared virtual address spaces in accordance with examples as disclosed herein.

FIG. 6 shows a flowchart illustrating a method 600 that supports shared virtual address spaces in accordance with examples as disclosed herein. The operations of method 600 may be implemented by a memory device or its components as described herein. For example, the operations of method 600 may be performed by a memory device as described with reference to FIGS. 1 through 5. In some examples, a memory device may execute a set of instructions to control the functional elements of the device to perform the described functions. Additionally or alternatively, the memory device may perform aspects of the described functions using special-purpose hardware.

At 605, the method may include receiving, at a first memory device, a memory request associated with a virtual address of a virtual address space. The operations of 605 may be performed in accordance with examples as disclosed herein. In some examples, aspects of the operations of 605 may be performed by a reception component 525 as described with reference to FIG. 5.

At 610, the method may include determining that the virtual address is within a shared address space of the virtual address space based at least in part on the virtual address. The operations of 610 may be performed in accordance with examples as disclosed herein. In some examples, aspects of the operations of 610 may be performed by a determination component 530 as described with reference to FIG. 5.

At 615, the method may include determining that the virtual address is associated with the first memory device based at least in part on the virtual address, a device identifier associated with the first memory device for the shared address space, and a parameter associated with a range of the virtual address corresponding to a device identifier of the memory request. The operations of 615 may be performed in accordance with examples as disclosed herein. In some examples, aspects of the operations of 615 may be performed by a determination component 530 as described with reference to FIG. 5.

At 620, the method may include translating the virtual address to a physical address associated with the first memory device based at least in part on determining that the virtual address is within the shared address space and associated with the first memory device. The operations of 620 may be performed in accordance with examples as disclosed herein. In some examples, aspects of the operations of 620 may be performed by an address translation component 535 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for receiving, at a first memory device, a memory request associated with a virtual address of a virtual address space, determining that the virtual address is within a shared address space of the virtual address space based at least in part on the virtual address, determining that the virtual address is associated with the first memory device based at least in part on the virtual address, a device identifier associated with the first memory device for the shared address space, and a parameter associated with a range of the virtual address corresponding to a device identifier of the memory request, and translating the virtual address to a physical address associated with the first memory device based at least in part on determining that the virtual address is within the shared address space and associated with the first memory device.

Some examples of the method 600 and the apparatus described herein may further include operations, features, circuitry, logic, means, or instructions for receiving, from a host system coupled with the first memory device, the parameter associated with the range of the virtual address corresponding to the device identifier, where determining that the virtual address may be associated with the first memory device may be based at least in part on receiving the parameter.

In some examples of the method 600 and the apparatus described herein, determining that the virtual address may be within the shared address space of the virtual address space may include operations, features, circuitry, logic, means, or instructions for comparing a first value represented by a first subset of bits that may be included in the virtual address to a second value and comparing the first value represented by the first subset of bits that may be included in the virtual address to a third value based at least in part on comparing the first value to the second value.

Some examples of the method 600 and the apparatus described herein may further include operations, features, circuitry, logic, means, or instructions for determining that the first value may be greater than or equal to the second value and determining that the first value may be less than or equal to the third value, where the virtual address may be within the shared address space of the virtual address space based at least in part on the first value being greater than or equal to the second value and the first value being less than or equal to the third value.

In some examples of the method 600 and the apparatus described herein, determining that the virtual address may be associated with the first memory device may include operations, features, circuitry, logic, means, or instructions for identifying a second subset of bits that may be included in the virtual address based at least in part on the parameter associated with the range of the virtual address and comparing a second value represented by the second subset of bits to the device identifier based at least in part on identifying the second subset of bits, where translating the virtual address to the physical address may be based at least in part on the second value matching the device identifier associated with the first memory device.

In some examples of the method 600 and the apparatus described herein, the virtual address includes a third subset of bits that indicate a position of a first bit included in the second subset of bits, and identifying the second subset of bits may be based at least in part on a third value represented by the third subset of bits.

In some examples of the method 600 and the apparatus described herein, determining that the virtual address may be associated with the first memory device may include operations, features, circuitry, logic, means, or instructions for identifying, for each of the plurality of parameters, respective subsets of bits of the virtual address based at least in part on a respective parameter of the plurality of parameters and comparing values represented by the respective subsets of bits to respective device identifiers of the plurality of device identifiers based at least in part on identifying the respective subsets of bits, where translating the virtual address to the physical address may be based at least in part on the one of the values matching the respective device identifier.

Some examples of the method 600 and the apparatus described herein may further include operations, features, circuitry, logic, means, or instructions for translating the virtual address to the physical address may be based at least in part on one or more processes associated with the shared address space of the virtual address space.

Some examples of the method 600 and the apparatus described herein may further include operations, features, circuitry, logic, means, or instructions for receiving, from a host system coupled with the first memory device, signaling including the device identifier associated with the first memory device for the shared address space and the parameter associated with the range of the virtual address corresponding to the device identifier, where the device identifier and the parameter may be stored to a table for determining whether virtual addresses may be associated with the first memory device.

Some examples of the method 600 and the apparatus described herein may further include operations, features, circuitry, logic, means, or instructions for transmitting the virtual address to a second memory device based at least in part on determining that the virtual address may be not associated with the first memory device.

Some examples of the method 600 and the apparatus described herein may further include operations, features, circuitry, logic, means, or instructions for generating an identifier associated with the shared address space of the virtual address space based at least in part on determining that the virtual address may be not associated with the first memory device and transmitting the identifier with the virtual address to the second memory device based at least in part on generating the identifier.

Figure 7:
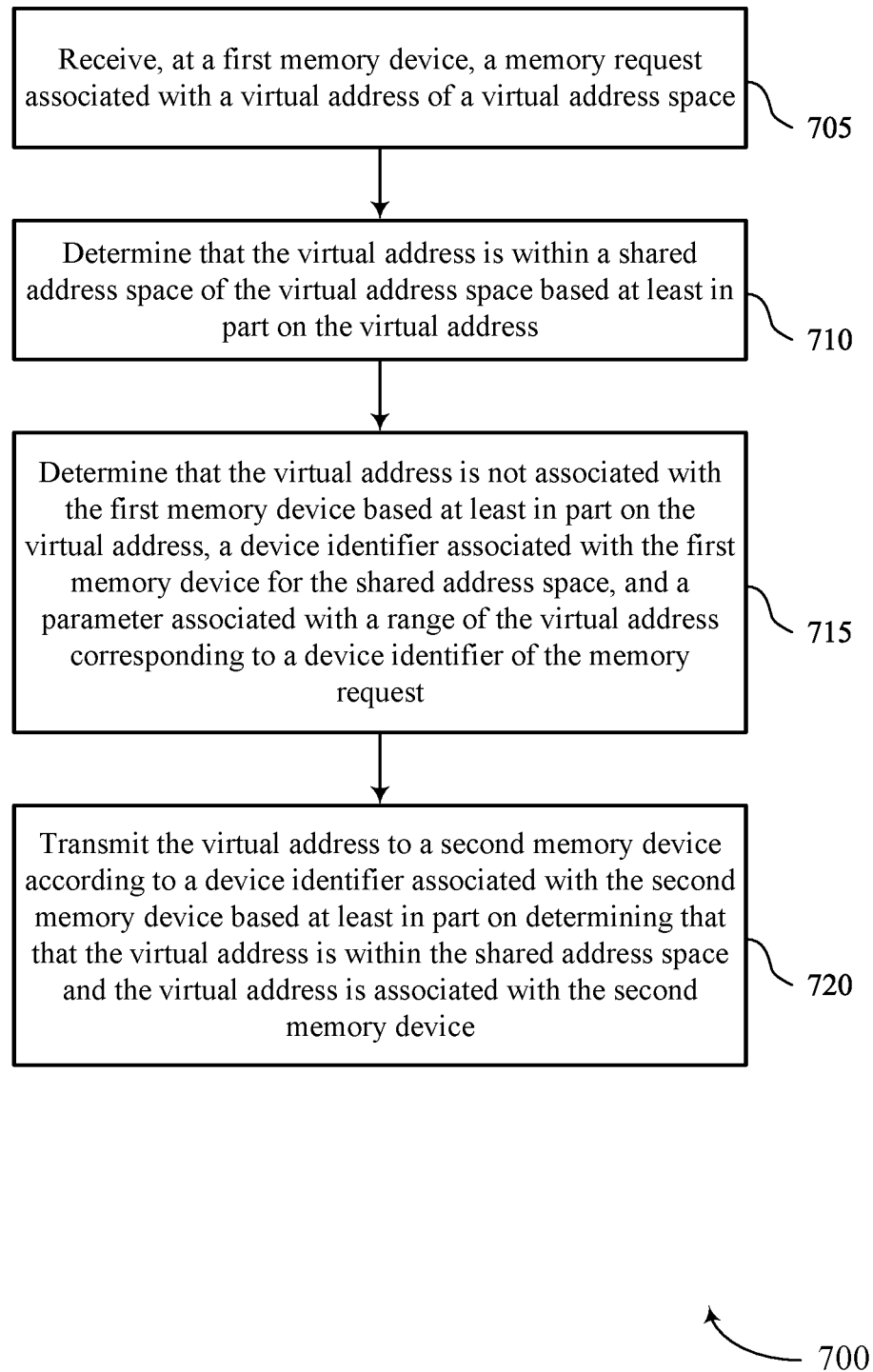

FIG. 7 shows a flowchart illustrating a method 700 that supports shared virtual address spaces in accordance with examples as disclosed herein. The operations of method 700 may be implemented by a memory device or its components as described herein. For example, the operations of method 700 may be performed by a memory device as described with reference to FIGS. 1 through 5. In some examples, a memory device may execute a set of instructions to control the functional elements of the device to perform the described functions. Additionally or alternatively, the memory device may perform aspects of the described functions using special-purpose hardware.

At 705, the method may include receiving, at a first memory device, a memory request associated with a virtual address of a virtual address space. The operations of 705 may be performed in accordance with examples as disclosed herein. In some examples, aspects of the operations of 705 may be performed by a reception component 525 as described with reference to FIG. 5.

At 710, the method may include determining that the virtual address is within a shared address space of the virtual address space based at least in part on the virtual address. The operations of 710 may be performed in accordance with examples as disclosed herein. In some examples, aspects of the operations of 710 may be performed by a determination component 530 as described with reference to FIG. 5.

At 715, the method may include determining that the virtual address is not associated with the first memory device based at least in part on the virtual address, a device identifier associated with the first memory device for the shared address space, and a parameter associated with a range of the virtual address corresponding to a device identifier of the memory request. The operations of 715 may be performed in accordance with examples as disclosed herein. In some examples, aspects of the operations of 715 may be performed by a determination component 530 as described with reference to FIG. 5.

At 720, the method may include transmitting the virtual address to a second memory device according to a device identifier associated with the second memory device based at least in part on determining that that the virtual address is within the shared address space and the virtual address is associated with the second memory device. The operations of 720 may be performed in accordance with examples as disclosed herein. In some examples, aspects of the operations of 720 may be performed by a transmission component 540 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving, at a first memory device, a memory request associated with a virtual address of a virtual address space, determining that the virtual address is within a shared address space of the virtual address space based at least in part on the virtual address, determining that the virtual address is not associated with the first memory device based at least in part on the virtual address, a device identifier associated with the first memory device for the shared address space, and a parameter associated with a range of the virtual address corresponding to a device identifier of the memory request, and transmitting the virtual address to a second memory device according to a device identifier associated with the second memory device based at least in part on determining that that the virtual address is within the shared address space and the virtual address is associated with the second memory device.

In some examples of the method 700 and the apparatus described herein, the method may include generating, based at least in part on determining that the virtual address is not associated with the first memory device, a second identifier for transmitting to the second memory device, wherein the second identifier is associated with a global virtual address, wherein transmitting the virtual address comprises transmitting the second identifier.

In some examples of the method 700 and the apparatus described herein, determining that the virtual address may be not associated with the first memory device may include operations, features, circuitry, logic, means, or instructions for identifying a subset of bits that may be included in the virtual address based at least in part on the parameter associated with the range of the virtual address corresponding to the device identifier of the memory request and comparing a value represented by the subset of bits to the device identifier based at least in part on identifying the subset of bits, where transmitting the virtual address to the second memory device may be based at least in part on the value being different than the device identifier associated with the first memory device.

In some examples of the method 700 and the apparatus described herein, the first memory device may be located within a first memory system and the second memory device may be located within a second memory system that may be different than the first memory system.

In some examples of the method 700 and the apparatus described herein, the first memory device and the second memory device may be each located within a same memory system.

In some examples of the method 700 and the apparatus described herein, the first memory device and the second memory device may be associated with respective ranges of the shared address space of the virtual address space.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if" "when," "based on," or "based at least in part on" may be used interchangeably. In some examples, if the terms "if" "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   receiving, at a first memory device, a memory request associated with a virtual address of a virtual address space;
   determining that the virtual address is within a shared address space of the virtual address space based at least in part on the virtual address;
   determining that the virtual address is associated with the first memory device based at least in part on a first value corresponding to a first device identifier associated with the first memory device for the shared address space and a second value indicated by a range of the virtual address, the second value corresponding to a second device identifier associated with the memory request, wherein the virtual address comprises the first value and the second value; and
   translating the virtual address to a physical address associated with the first memory device based at least in part on determining that the virtual address is within the shared address space.

2. The method of claim 1, further comprising:
   receiving, from a host system coupled with the first memory device, the second value indicated by the range of the virtual address, wherein determining that the virtual address is associated with the first memory device is based at least in part on receiving the second value.

3. The method of claim 1, wherein determining that the virtual address is within the shared address space of the virtual address space comprises:
   comparing a third value represented by a first subset of bits that are included in the virtual address to a fourth value; and
   comparing the third value represented by the first subset of bits that are included in the virtual address to a fifth value.

4. The method of claim 3, further comprising:
   determining that the third value is greater than or equal to the fourth value; and
   determining that the third value is less than or equal to the fifth value, wherein the virtual address is within the shared address space of the virtual address space based at least in part on the third value being greater than or equal to the fourth value and the third value being less than or equal to the fifth value.

5. The method of claim 1, wherein determining that the virtual address is associated with the first memory device comprises:
   identifying a second subset of bits that are included in the virtual address based at least in part on a parameter associated with the range of the virtual address, wherein the second value is represented by the second subset of bits; and
   comparing the second value represented by the second subset of bits to the first value based at least in part on identifying the second subset of bits, wherein translating the virtual address to the physical address is based at least in part on the second value matching the first value corresponding to the first device identifier associated with the first memory device.

6. The method of claim 5, wherein the virtual address comprises a third subset of bits that indicate a position of a first bit included in the second subset of bits, wherein identifying the second subset of bits is based at least in part on a third value represented by the third subset of bits.

7. The method of claim 1, wherein the virtual address comprises a plurality of third values corresponding to a plurality of device identifiers associated with a respective plurality of shared address spaces and a plurality of fourth values indicated by respective ranges of the virtual address corresponding to the plurality of shared address spaces, and wherein determining that the virtual address is associated with the first memory device comprises:
   identifying, for each of the plurality of fourth values, respective subsets of bits of the virtual address based at least in part on a respective range of the virtual address, wherein each fourth value is represented by a respective subset of bits; and
   comparing the fourth values represented by the respective subsets of bits to respective third values of the plurality of third values based at least in part on identifying the respective subsets of bits, wherein translating the virtual address to the physical address is based at least in part on one of the fourth values matching the respective third values.

8. The method of claim 1, wherein translating the virtual address to the physical address is based at least in part on one or more processes associated with the shared address space of the virtual address space.

9. The method of claim 1, further comprising:
   receiving, from a host system coupled with the first memory device, signaling comprising the first value corresponding to the first device identifier associated with the first memory device for the shared address space and the second value indicated by the range of the virtual address corresponding to the second device identifier associated with the memory request, wherein the first value and the second value are stored to a table for determining whether virtual addresses are associated with the first memory device.

10. The method of claim 1, further comprising:
    transmitting the virtual address to a second memory device based at least in part on determining that the virtual address is not associated with the first memory device.

11. The method of claim 10, further comprising:
    generating an identifier associated with the shared address space of the virtual address space based at least in part on determining that the virtual address is not associated with the first memory device; and transmitting the identifier with the virtual address to the second memory device based at least in part on generating the identifier.

12. A first memory device, comprising:
one or more memory mediums; and
processing circuitry coupled with the one or more memory mediums and configured to cause the first memory device to:
receive a memory request associated with a virtual address of a virtual address space;
determine that the virtual address is within a shared address space of the virtual address space based at least in part on the virtual address;
determine that the virtual address is associated with the first memory device based at least in part on a first value corresponding to a first device identifier associated with the first memory device for the shared address space and a second value indicated by a range of the virtual address, the second value corresponding to a second device identifier associated with the memory request, wherein the virtual address comprises the first value and the second value; and
translate the virtual address to a physical address associated with the one or more memory mediums based at least in part on determining that the virtual address is within the shared address space.

13. The first memory device of claim 12, wherein the processing circuitry is further configured to cause the first memory device to:
receive, from a host system coupled with the first memory device, the second value indicated by the range of the virtual address, wherein determining that the virtual address is associated with the first memory device is based at least in part on receiving the second value.

14. The first memory device of claim 12, wherein, to determine that the virtual address is within the shared address space of the virtual address space, the processing circuitry is configured to cause the first memory device to:
compare a third value represented by a first subset of bits that are included in the virtual address to a fourth value; and
compare the third value represented by the first subset of bits that are included in the virtual address to a fifth value.

15. The first memory device of claim 14, wherein the processing circuitry is further configured to cause the first memory device to:
determine that the third value is greater than or equal to the fourth value; and
determine that the third value is less than or equal to the fifth value, wherein the virtual address is within the shared address space of the virtual address space based at least in part on the third value being greater than or equal to the fourth value and the third value being less than or equal to the fifth value.

16. The first memory device of claim 12, wherein, to determine that the virtual address is associated with the first memory device, the processing circuitry is configured to cause the first memory device to:
identify a second subset of bits that are included in the virtual address based at least in part on a parameter associated with the range of the virtual address, wherein the second value is represented by the second subset of bits; and
compare the second value represented by the second subset of bits to the first value based at least in part on identifying the second subset of bits, wherein translating the virtual address to the physical address is based at least in part on the second value matching the first value corresponding to the first device identifier associated with the first memory device.

17. The first memory device of claim 16, wherein the virtual address comprises a third subset of bits that indicate a position of a first bit included in the second subset of bits, wherein identifying the second subset of bits is based at least in part on a third value represented by the third subset of bits.

18. The first memory device of claim 16, wherein the virtual address comprises a plurality of third values corresponding to a plurality of device identifiers associated with a respective plurality of shared address spaces and a plurality of fourth values indicated by respective ranges of the virtual address corresponding to the plurality of shared address spaces, and wherein, to determine that the virtual address is associated with the first memory device, the processing circuitry is configured to cause the first memory device to:
identify, for each of the plurality of fourth values, respective subsets of bits of the virtual address based at least in part on a respective range of the virtual address, wherein each fourth value is represented by a respective subset of bits; and
compare the fourth values represented by the respective subsets of bits to respective third values of the plurality of third values based at least in part on identifying the respective subsets of bits, wherein translating the virtual address to the physical address is based at least in part on one of the fourth values matching the respective third values.

19. The first memory device of claim 12, wherein the processing circuitry is further configured to cause the first memory device to:
translate the virtual address to the physical address based at least in part on one or more processes associated with the shared address space of the virtual address space.

20. The first memory device of claim 12, wherein the processing circuitry is further configured to cause the first memory device to:
receive, from a host system coupled with the first memory device, signaling comprising the first value corresponding to the first device identifier associated with the first memory device for the shared address space and the second value indicated by the range of the virtual address corresponding to the second device identifier associated with the memory request, wherein the first value and the second value are stored to a table for determining whether virtual addresses are associated with the first memory device.

21. The first memory device of claim 12, wherein the processing circuitry is further configured to cause the first memory device to:
transmit the virtual address to a second memory device based at least in part on determining that the virtual address is not associated with the first memory device.

22. The first memory device of claim 21, wherein the processing circuitry is further configured to cause the first memory device to:
generate an identifier associated with the shared address space of the virtual address space based at least in part on determining that the virtual address is not associated with the first memory device; and
transmit the identifier with the virtual address to the second memory device based at least in part on generating the identifier.

23. A non-transitory computer-readable medium storing code comprising instructions which, when executed by a processor of a first memory device, cause the first memory device to:
- receive a memory request associated with a virtual address of a virtual address space;
- determine that the virtual address is within a shared address space of the virtual address space based at least in part on the virtual address;
- determine that the virtual address is associated with the first memory device based at least in part on a first value corresponding to a first device identifier associated with the first memory device for the shared address space and a second value indicated by a range of the virtual address, the second value corresponding to a second device identifier associated with the memory request, wherein the virtual address comprises the first value and the second value; and
- translate the virtual address to a physical address associated with the first memory device based at least in part on determining that the virtual address is within the shared address space.

\* \* \* \* \*